US006837325B2

(12) United States Patent
Shimizu

(10) Patent No.: US 6,837,325 B2
(45) Date of Patent: Jan. 4, 2005

(54) BODY CONSTRUCTION OF ELECTRIC CAR

(75) Inventor: Hiroshi Shimizu, Kamakura (JP)

(73) Assignee: Japan Science and Technology Corporation (JP)

( * ) Notice: Subject to any disclaimer, the term of this patent is extended or adjusted under 35 U.S.C. 154(b) by 0 days.

(21) Appl. No.: 10/250,333

(22) PCT Filed: Aug. 8, 2002

(86) PCT No.: PCT/JP02/08112

§ 371 (c)(1),
(2), (4) Date: Jun. 30, 2003

(87) PCT Pub. No.: WO03/104009

PCT Pub. Date: Dec. 18, 2003

(65) Prior Publication Data

US 2004/0134699 A1 Jul. 15, 2004

(30) Foreign Application Priority Data

Jun. 11, 2002 (JP) ........................ 2002-169900

(51) Int. Cl.⁷ .............................. B60R 16/04
(52) U.S. Cl. .................................. 180/68.5
(58) Field of Search .................. 180/65.1, 65.5, 180/68.5; 280/782; 429/96–100

(56) References Cited

U.S. PATENT DOCUMENTS

| 384,576 | A | * | 6/1888 | Hunter ......................... 105/51 |
| 446,817 | A | * | 2/1891 | Hunter ......................... 105/51 |
| 1,551,594 | A | * | 9/1925 | Maurice ..................... 180/65.1 |
| 4,109,064 | A | * | 8/1978 | Warner et al. ................. 429/66 |
| 4,216,839 | A | * | 8/1980 | Gould et al. ............... 180/65.1 |
| 5,501,289 | A | * | 3/1996 | Nishikawa et al. ......... 180/68.5 |
| 5,686,818 | A | * | 11/1997 | Scaduto ..................... 180/65.1 |
| 5,833,023 | A |   | 11/1998 | Shimizu ..................... 180/68.5 |

FOREIGN PATENT DOCUMENTS

| DE | 4032605 | * | 3/1992 |
| GB | 2096954 | * | 10/1982 |
| JP | 6-12149 |   | 2/1994 |
| JP | 10-278596 |   | 10/1998 |
| JP | 10-322809 |   | 12/1998 |

* cited by examiner

Primary Examiner—Bryan Fischmann
(74) Attorney, Agent, or Firm—Lorusso, Loud & Kelly

(57) ABSTRACT

The present invention provides a body construction for an electric car having a flat floor and allowing batteries to be easily mounted therein and removed therefrom and to be accommodated under the floor in a space-effective manner, in which power lines are rationally wired. The batteries feed power to a plurality of in-wheel motors. A front wheel frame supporting the front wheels and a rear wheel frame supporting the rear wheels are coupled by a backbone member having an approximately rectangular hollow cross-section, and pluralities of battery-accommodating hollow frames connect perpendicular to the right and left side surfaces of the backbone member, so as to lie parallel to each other.

4 Claims, 4 Drawing Sheets

BODY CONSTRUCTION OF ELECTRIC CAR

CROSS-REFERENCE TO RELATED APPLICATIONS

This application is a National Phase Application (35 USC 371) of PCT/JP02/08112 and claims priority of Japanese Application No. 2002-169900 filed Jun. 11, 2002.

TECHNICAL FIELD

The present invention relates to a body construction of an electric car, and in particular, it relates to a construction of a floor portion of its car body.

PRIOR ART

Since an electric car is required to carry a large number of batteries in its body, the inventor of the present invention and others have proposed, in Japanese Unexamined Patent Application Publication No. 10-278596, a battery-built-in-frame construction for rationally accommodating the batteries in a floor portion of the car body.

The above-mentioned known floor portion of the car body is formed of a plurality of hollow frames having a rectangular cross-section for accommodating the batteries and arranged parallel to each other in the longitudinal direction of the car and thereby offers the advantages that the batteries can be rationally accommodated and also that the floor surface can be made flat.

However, the above-mentioned construction has drawbacks that, since a large number of batteries are accommodated in a row in each long frame, when one of the batteries in the row malfunctions, it is time-consuming to replace the malfunctioning battery with a new one, and also since each power line must be led from the front end or rear end battery, power lines for feeding power to drive motors remote from the batteries become longer and also their wiring becomes complicated.

SUMMARY OF THE INVENTION

In view of the above-mentioned problems, an object of the present invention is to provide a body construction for an electric car having a flat floor and allowing batteries to be easily installed therein and removed therefrom and to be accommodated under the floor in a space-effective manner, with rational wiring of the power lines.

In order to achieve the above-mentioned object, the present invention provides a body construction for an electric car in which batteries for feeding power to a plurality of in-wheel motors are accommodated in a floor portion of the car body, wherein a front wheel frame for supporting front wheels and a rear wheel frame for supporting rear wheels are coupled by a backbone member having an approximately rectangular hollow cross-section, and pluralities of battery-accommodating hollow frames for holding the batteries are disposed to the sides of the backbone member so as to lie parallel to each other and perpendicular to the longitudinal direction of the backbone member.

Inverters for the in-wheel motors are arranged next to the corresponding in-wheel motors either in the front wheel frame or in the rear wheel frame and power lines from the batteries to the inverters extend through the hollow of the backbone member.

The in-wheel motors and the batteries are respectively divided into two systems; the batteries of one system are accommodated in the hollow frames disposed to one side of the backbone member and the batteries of the other system are accommodated in the hollow frames disposed to the other side of the backbone member.

The front wheel frame and the rear wheel frame have a frame structure substantially the same height as the battery-accommodating hollow frames and the inverters are arranged in these frame structures.

DESCRIPTION OF THE PREFERRED EMBODIMENTS

Embodiments of the present invention will be described in detail with reference to the accompanying drawings.

Figure 1:
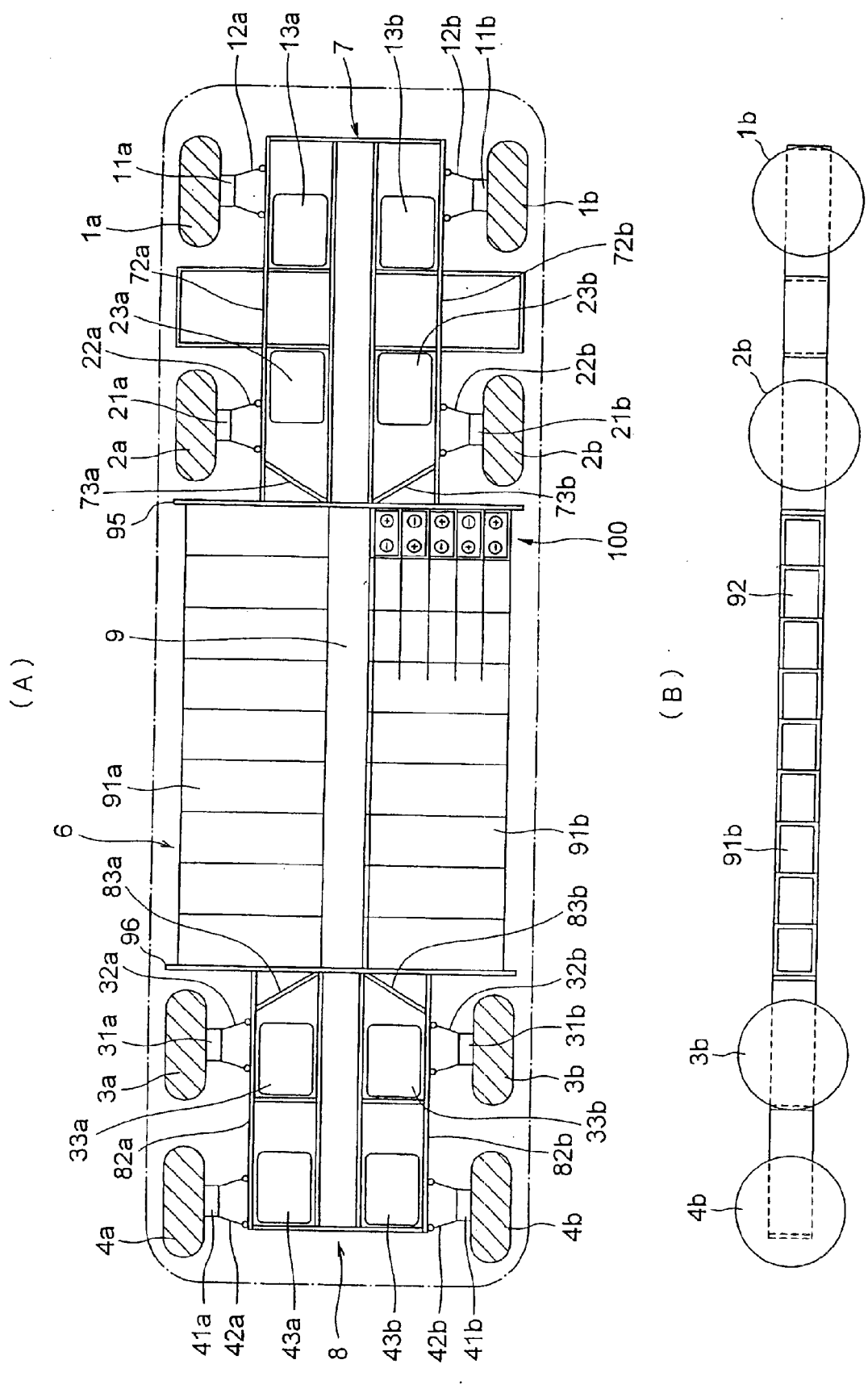
FIG. 1A is a plan view of a body construction of an eight-wheel electric car according to a first embodiment of the present invention.
FIG. 1B is a side view of the embodiment shown in FIG. 1A.
Figure 2:
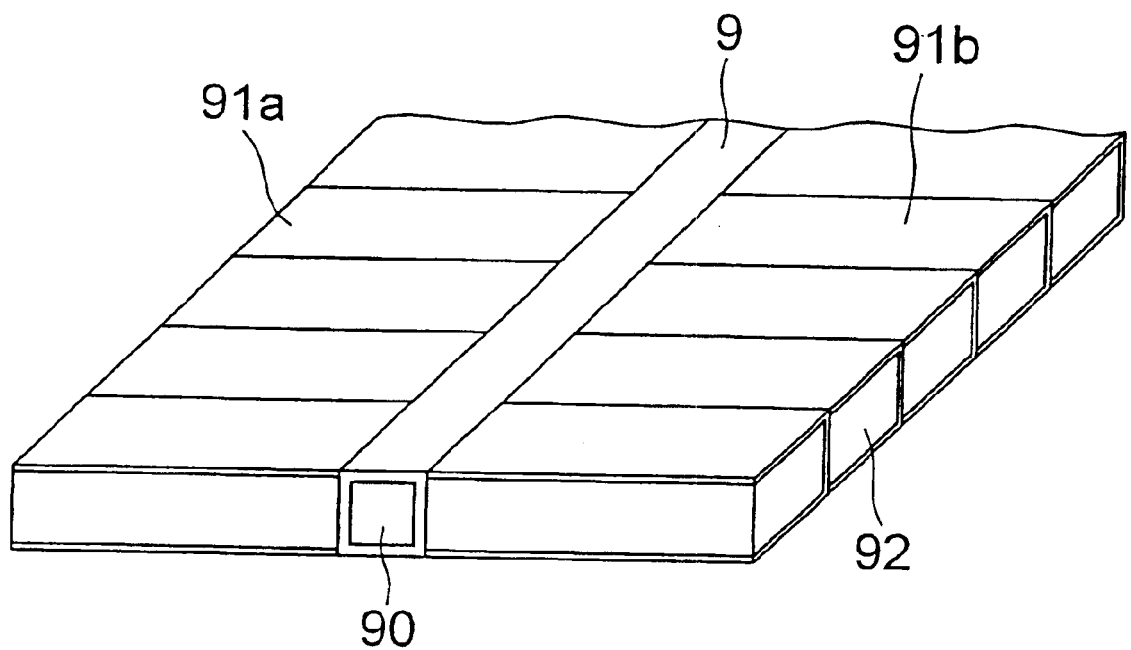
FIG. 2 is a partial perspective view illustrating a backbone member and hollow frames of the body construction of the eight-wheel electric car according to the first embodiment of the present invention.

As shown in FIGS. 1A, 1B and 2, the first embodiment provides a chassis 6 for an eight-wheel-drive electric car, having front front-wheels 1a and 1b, front rear-wheels 2a and 2b, rear front-wheels 3a and 3b, and rear rear-wheels 4a and 4b and drive motors (in-wheel motors) 11a and 11b, 21a and 21b, 31a and 31b, and 41a and 41b respectively built in the corresponding wheels.

The skeleton of the chassis 6 is formed of a front wheel frame 7, a rear wheel frame 8, and a backbone member 9 extending between the frames 7 and 8 and rigidly connecting the frames 7 and 8 with each other.

The front wheel frame 7 made from a structural member such as a steel channel is formed by frame members 72a and 72b, the former having suspension mechanisms 12a and 12b fixed thereto for respectively suspending the front front-wheels 1a and 1b and the latter having suspension mechanisms 22a and 22b fixed thereto for respectively suspending the front rear-wheels 2a and 2b. Reinforcing members 73a and 73b, for example, H-section steel members, serve to increase the rigidity of the connection between the backbone member 9 and the front wheel frame 7.

The rear wheel frame 8 also made from a structural member such as a steel channel is formed by frame members 82a and 82b, the former having suspension mechanisms 32a and 32b fixed thereto for respectively suspending the rear front-wheels 3a and 3b and the latter having suspension mechanisms 42a and 42b fixed thereto for respectively suspending the rear rear-wheels 4a and 4b. Reinforcing members 83a and 83b, for example H-section steel, serve to increase the rigidity of this connection between the backbone member 9 and the rear wheel frame 8.

As shown in FIG. 2, the backbone member 9 has hollow interior 90 with a rectangular cross-section. Pluralities of battery-accommodating hollow frames 91a and 91b made from an aluminum material formed by, for example, drawing, are welded perpendicular to both sides of the backbone member 9. Each of the battery-accommodating hollow frames 91*a* and 91*b* has a hollow interior 92 for accommodating a group of batteries (not shown).

Also, the chassis 6 has reinforcing members 95 and 96 for reinforcing the strengths of the front and rear portions of the battery-accommodating hollow frames 91*a* and 91*b* and for increasing the rigidity of the connections between the backbone member 9 and the front and rear wheel frames 7 and 8.

Figure 3:
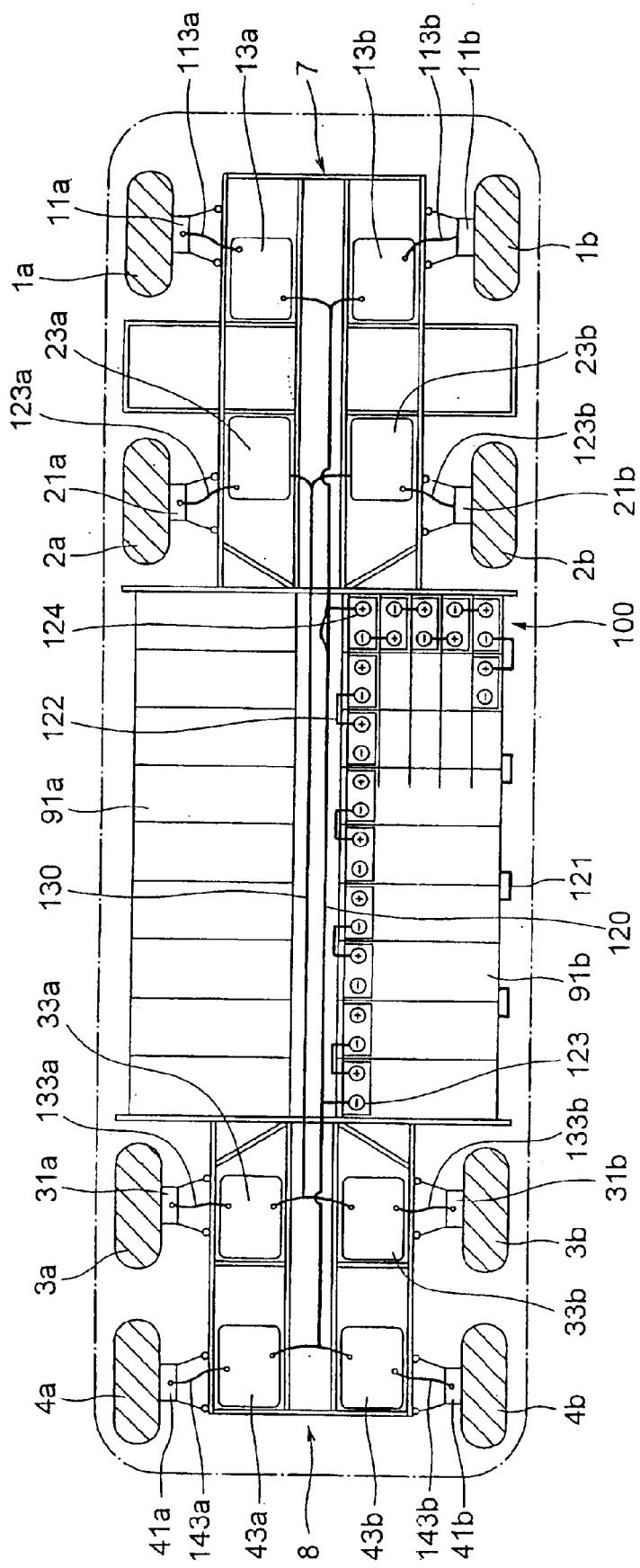
FIG. 3 illustrates the wiring of electrical power lines in the first embodiment of the present invention.

FIG. 3 illustrates the wiring of electrical power lines in the first embodiment of the present invention. Although the power lines are not visible from above since they are actually arranged in the hollow 90 of the backbone member 9 (see FIG. 2), they are illustrated in FIG. 3 as if upper plate of the backbone member 9 has been removed for facilitating understanding of the wiring.

As shown in FIG. 3, the batteries are divided into two systems: batteries 100 of a first system are accommodated in the hollows 92 of the corresponding battery-accommodating hollow frames 91*b*, and batteries of a second system (not shown) are accommodated in the hollows 92 of the corresponding battery-accommodating hollow frames 91*a* Output of the batteries 100 of the first system is connected to front front-wheel inverters 13*a* and 13*b* and to rear rear-wheel inverters 43*a* and 43*b* via power lines 120 of the first system; furthermore, the output is connected from the inverters 13*a* and 13*b* to the drive motors 11*a* and 11*b* via three-phase power lines 113*a* and 113*b*, respectively, and is also connected from the inverters 43*a* and 43*b* to the drive motors 41*a* and 41*b* via three-phase power lines 143*a* and 143*b*, respectively.

Likewise, output of the batteries of the second system is connected to front rear-wheel inverters 23*a* and 23*b* and to rear front-wheel inverters 33*a* and 33*b* via power lines 130 of the second system; furthermore, the output is connected from the inverters 23*a* and 23*b* to the drive motors 21*a* and 21*b* via three-phase power lines 123*a* and 123*b*, respectively, and is also connected from the inverters 33*a* and 33*b* to the drive motors 31*a* and 31*b* via three-phase power lines 133*a* and 133*b*, respectively.

The front wheel frame 7 and the rear wheel frame 8 have substantially the same height as that of the battery-accommodating hollow frames 91*a* and 91*b* so that the foregoing inverters 13*a*, 13*b*, 23*a*, and 23*b*, or 33*a*, 33*b*, 43*a*, and 43*b* are arranged in the corresponding frame structure.

Since the power lines 120 and 130 of the respective first and second systems are arranged in the hollow 90 of the backbone member 9, even in the case of a strong side impact or the like on the power lines 120 and 130, they are protected from damage. Also, when portions of the front wheel frame 7 and the rear wheel frame 8, which are coupled to the backbone member 9 and through which the power lines extend, have a channel structure, the safety of the power lines can be further improved.

Since the batteries accommodated in each of the battery-accommodating hollow frames 91*a* and 91*b* are required to be connected in series so as to provide a high voltage, the batteries in the adjacent hollows 92 are connected with each other either by an external connecting wire 121 at the outer side of the batteries or by an internal connecting wire 122 at the inner side thereof. With this structure, the internal connecting wires 122 are disposed in the hollow 90 of the backbone member 9, and automatic connecting terminals, through which electrodes of the innermost batteries are automatically connected to the corresponding internal connecting wires 122 when the groups of batteries are inserted into the corresponding hollows 92 of the hollow frames 91*a* and 91*b*, are also disposed in the hollow 90. Also, a negative electrode 123 and a positive electrode 124 of the first system are connected to the corresponding power lines 120 of the first system by using corresponding automatic connecting terminals.

The backbone member 9 and the frames 7 and 8 may be used as the negative of the power lines 120 of the first system and of the power lines 130 of the second system.

Figure 4:
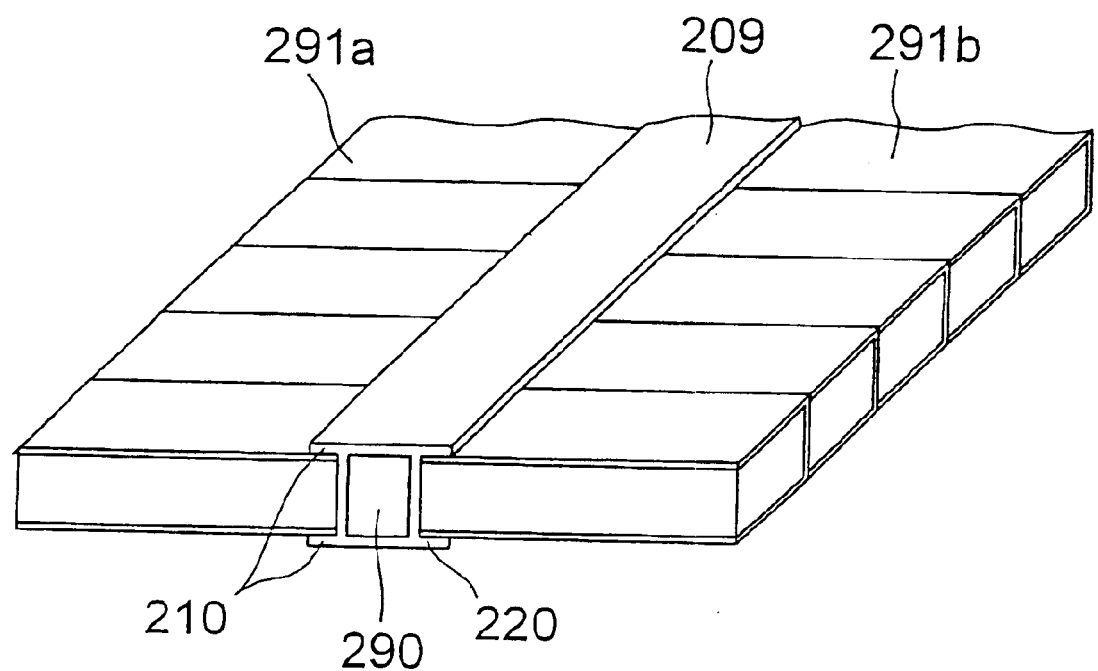
FIG. 4 is a partial perspective view illustrating a backbone member and hollow frames of a body construction of an electric car according to a second embodiment of the present invention.

FIG. 4 is a partial perspective view illustrating a second embodiment of a backbone member and hollow frames of a body construction of an electric car, having a different cross-section from that of the first embodiment shown in FIG. 2.

As shown in FIG. 4, a backbone member 209 has a sectional shape of a Greek numeral II and has a hollow 290 formed therein. With the backbone member of the second embodiment 209, battery-accommodating hollow frames 291*a* and 291*b* are sandwiched between an upper plate 210 and a lower plate 220 and are fixed to the backbone member 209 by welding or the like, thereby increasing the strength of the battery-accommodating hollow frames. 291*a* and 291*b* which are likely to be deformed by a shock.

As described above, the present invention provides a flat floor construction for the car body allowing batteries to be easily placed therein or removed therefrom and to be accommodated under the floor in a space-effective manner with power lines rationally wired.

Also, since the power lines are rationally wired, a body construction having a reduced risk of fire or the like, even in the event of emergency such as a car collision, is provided.

In addition, the present invention provides a battery-accommodating construction wherein the power sources (batteries) are divided into two systems.

The present invention is not limited to the above-described embodiments, and a variety of modifications based on the spirit of the present invention are considered to be within the scope of the present invention.

As described above in detail, the present invention offers the following advantages:

(A) Since a backbone member couples a front wheel frame and a rear wheel frame and hollow frames for accommodating batteries are perpendicularly fixed to both sides of the backbone member, the number of batteries in each hollow frame can be reduced, thereby allowing the batteries to be easily mounted in the hollow frames or replaced with new ones. Also, since the batteries are divided into two systems, even when batteries of one of the systems are damaged due to a side impact, the other system remains operative.

(B) Since the hollow interior of the backbone member houses power lines from the batteries to drive motors, the power lines can be easily wired and also protected against a collision or the like, thereby eliminating risks of getting an electric shock, fire, and the like.

(C) Since connecting wires for connecting groups of batteries in adjacent hollow frames are also accommodated in the hollow interior of the backbone member and automatic detachable mechanisms are employed for automatically connecting the wires and contacts of the corresponding batteries, the batteries are very easily connected.

(D) Since the hollow interior of the backbone member is used to house the power lines, the power lines from the batteries to the inverters of the corresponding motors can be wired in the shortest path.

According to the present invention, a body construction of an electric car, which emits no toxic exhaust gas and which is environmentally friendly, is improved.

What is claimed is:

1. An electric car body in which batteries for feeding a power to a plurality of wheel motors are accommodated in a floor portion of a car body, comprising:

a front wheel frame supporting front wheels and a rear wheel frame supporting rear wheels;

a backbone member having an approximately rectangular hollow cross-section and connecting the front wheel frame with the rear wheel frame; and pluralities of battery-accommodating hollow frames for accommodating the batteries, said hollow frames extending perpendicularly from opposite side surfaces of the backbone member so as to lie parallel to each other.

2. The electric car body according to claim 1, wherein inverters for the wheel motors are arranged adjacent the corresponding in-wheel motors either in the front wheel frame or in the rear wheel frame and power lines from the batteries to the inverters extend through the hollow of the backbone member.

3. The electric car body according to claim 2, wherein the front wheel frame and the rear wheel frame form a frame structure having substantially the same height the battery-accommodating hollow frames and the inverters are arranged in the frame structure.

4. The electric car body according to claim 1, wherein the wheel motors and the batteries are divided into two systems, the batteries of one system being accommodated in the hollow frames disposed to one side of the backbone member and the batteries of the other system being accommodated in the hollow frames disposed to the other side of the backbone member.

* * * * *

UNITED STATES PATENT AND TRADEMARK OFFICE
CERTIFICATE OF CORRECTION

PATENT NO. : 6,837,325 B2
DATED : January 4, 2005
INVENTOR(S) : Hiroshi Shimizu

It is certified that error appears in the above-identified patent and that said Letters Patent is hereby corrected as shown below:

Column 6,
Line 6, "height the" should read -- height as the --.

Signed and Sealed this

Seventh Day of February, 2006

JON W. DUDAS
*Director of the United States Patent and Trademark Office*